United States Patent [19]
Shaw et al.

[11] Patent Number: 6,146,448
[45] Date of Patent: Nov. 14, 2000

[54] FLUX MANAGEMENT SYSTEM FOR A SOLDER REFLOW OVEN

[75] Inventors: Russell G. Shaw, Hopkinton; Walter James Hall, Waltham, both of N.H.; Roy J. Palhof, York, Me.; Phillip D. Bourgelais, Exeter, N.H.

[73] Assignee: Soltec B.V., Oosterhout, Netherlands

[21] Appl. No.: 09/184,723

[22] Filed: Nov. 2, 1998

[51] Int. Cl.[7] .............................. B01D 5/00; B01D 29/56; B01D 36/00; B01D 50/00
[52] U.S. Cl. .............................. 95/287; 95/288; 55/315.1; 55/318; 55/338.1; 55/385.6; 55/467; 55/486; 34/73; 34/80; 34/82
[58] Field of Search .......................... 55/339, 340, 338.1, 55/338, 315, 315.1, 318, 385.2, 385.6, 434, 434.2, 442, 486, 467; 95/288, 287; 34/73, 74, 76, 77, 79, 80, 82, 83; 165/908, DIG. 224; 366/162.4; 228/42

[56] References Cited

U.S. PATENT DOCUMENTS

| | | | |
|---|---|---|---|
| 4,348,174 | 9/1982 | Spigarelli | 34/78 |
| 4,951,401 | 8/1990 | Suzuki et al. | 34/77 |
| 4,971,026 | 11/1990 | Fineblum | 126/110 R |
| 4,996,781 | 3/1991 | Mishina et al. | 34/74 |
| 5,345,061 | 9/1994 | Chanasyk et al. | 219/388 |
| 5,481,087 | 1/1996 | Willemen | 219/388 |
| 5,573,688 | 11/1996 | Chanasyk et al. | 219/388 |
| 5,579,981 | 12/1996 | Matsumura et al. | 228/19 |
| 5,611,476 | 3/1997 | Soderland et al. | 228/42 |
| 5,623,829 | 4/1997 | Nutter et al. | 62/5 |
| 5,911,486 | 6/1999 | Dow et al. | 34/74 |
| 5,993,500 | 11/1999 | Bailey et al. | 55/385.6 |

FOREIGN PATENT DOCUMENTS 34 29 375  12/1985  Germany .

*Primary Examiner*—David A. Simmons
*Assistant Examiner*—Robert A. Hopkins
*Attorney, Agent, or Firm*—Orrick, Herrington & Sutcliffe, LLP

[57] ABSTRACT

A flux vapor management system for a reflow oven includes temperature control units disposed in heating and cooling regions of the oven. A fan within each of the temperature control units provides suction to an intake port. Intake ports of selected temperature control units in the heating region of the oven are connected with a barrier vent disposed between the heating and cooling regions of the oven. Gas drawn into the barrier vent by the suction from the intake ports prevents flux laden gas from migrating into the cooling region. The flux vapor management system also includes a filter for removing flux vapors from a reflow oven. The filter condenses flux vapors by converging a jet of hot gas from the oven with a cooled gas jet causing the flux vapors to condense while suspended in the gas stream. The flux laden gas does not contact any solid surface below the flux condensation temperature so there is no build-up of flux within the apparatus. The condensed flux forms particles or droplets that are trapped by a filter. A portion of the filtered gas is directed through a heat exchanger to create the cooled gas stream.

37 Claims, 7 Drawing Sheets

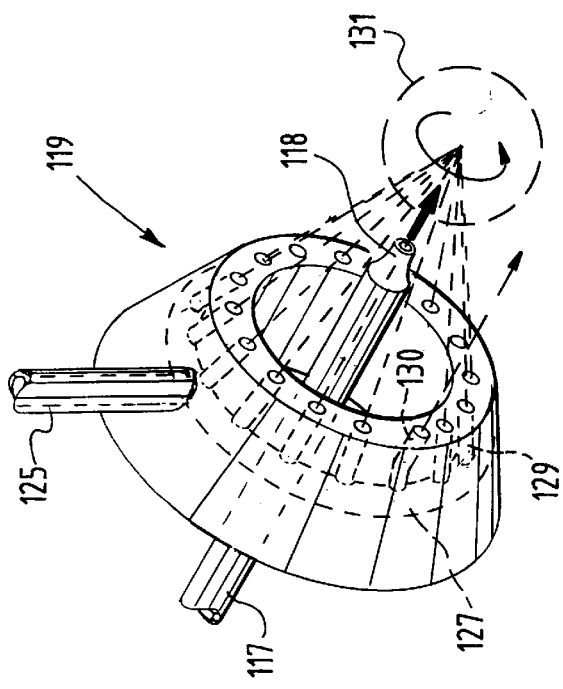
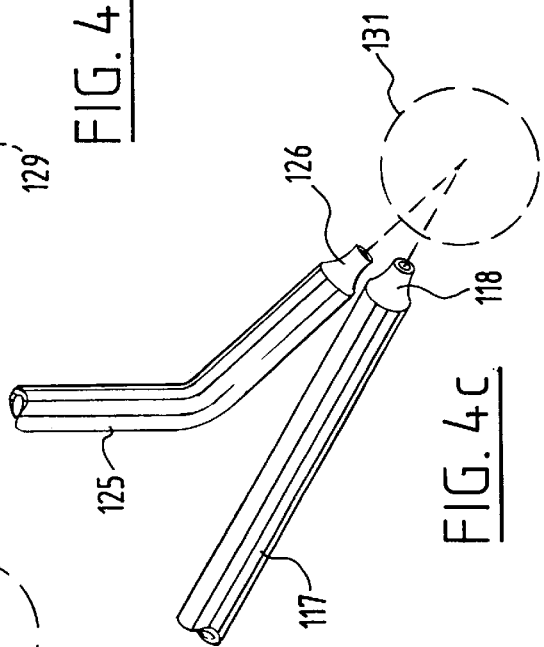
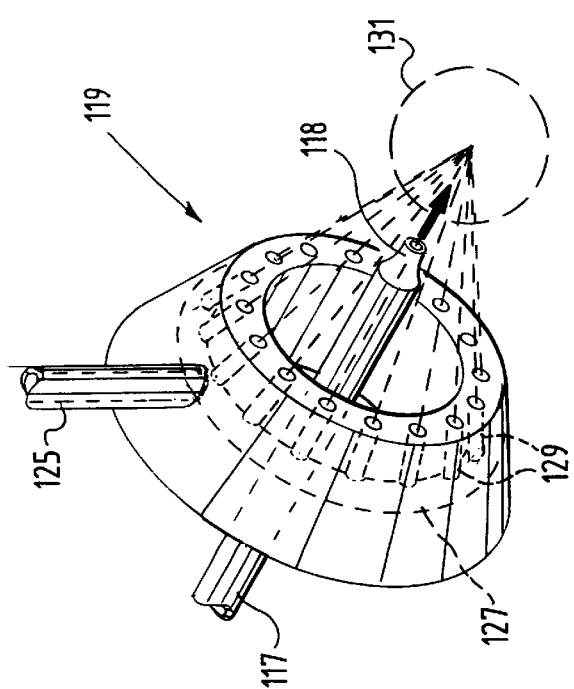
FIG. 4a
FIG. 4b
FIG. 4c

FLUX MANAGEMENT SYSTEM FOR A SOLDER REFLOW OVEN

FIELD OF THE INVENTION

The present invention relates generally to the field of ovens for reflow soldering devices to printed circuit boards, and more particularly to a method and an apparatus for removing flux vapors and other contaminants from the atmosphere of such ovens.

BACKGROUND

Printed circuit boards are commonly fabricated using the reflow solder technique. A paste containing solder particles mixed with flux, adhesives, binders, and other components is applied to selected areas of a printed circuit board. Electronic components are pressed against the applied solder paste. Adhesives in the paste hold the components to the printed circuit board. A conveyor belt within a reflow oven carries the printed circuit board and components through a high temperature region within the oven where they are heated to a temperature sufficient to cause the solder particles in the paste to melt. Molten solder wets metal contacts on the components and printed circuit board. Flux in the solder paste reacts with the contacts to remove oxides and to enhance wetting. The conveyor moves the heated printed circuit board to a cooling region of the oven where the molten solder solidifies forming a completed electronic circuit. An example of a typical reflow solder oven is the Vitronics M-series Reflow Soldering System, available from Vitronics Corporation, 2 Marin Way, Stratham, N.H., the assignee of the present investors.

The reaction of the flux with the contacts liberates vapors. Further, heat within the oven vaporizes unreacted flux as well as the adhesives, binders, and other components of the solder paste. The vapors from these materials accumulate within the oven leading to a number of problems. If the vapors migrate to the cooling region they will condense on the circuit boards, contaminating the boards and making subsequent cleaning steps necessary. The vapors will also condense on cooler surfaces within the oven, clogging gas orifices, gumming up moving parts, and creating a fire hazard. This condensation may also drip onto subsequent circuit boards destroying them, or making subsequent cleaning steps necessary. In addition, condensed vapors may contain corrosive and toxic chemicals which can damage equipment and create a hazard to personnel.

The vapors generated by the reflow operation collectively are referred to in this application as "flux vapors." It is understood that the flux vapors include vaporized flux, vapors from other components of the solder paste, reaction products released when the flux is heated, as well as vapors outgassed from the printed circuit board and electronic components.

Flux vapors can be flushed from the oven by providing a fresh supply of gas. This is not an ideal solution. In many cases the oven must be filled with an inert gas, for example nitrogen. Generating additional inert gas to flush the oven is expensive.

Several methods have been proposed for filtering flux vapors from the oven atmosphere. U.S. Pat. No. 5,579,981 (Matsumura et al.) cycles a portion of the oven atmosphere through an apparatus which cools the oven gases with a heat exchanger. The cooled vapors condense on the surface of the heat exchanger forming a liquid. The cooled gas is then reheated and any remaining vapors are combusted on a catalytic surface. The vapors that condense on the heat exchanger flow into a collection device for disposal.

U.S. Pat. No. 5,611,476 (Soderlund et al.) removes flux by cooling gas from the oven containing flux vapors on the surface of a heat exchanger, condensing the flux vapors. The cooled gas then passes through a filter to trap any remaining vapors not collected on the heat exchanger. The heat exchanger is either cleaned or replaced at intervals to remove the condensed flux vapors.

Each of these methods suffers from certain problems. Flux gases are a mixture of many components with a range of condensation temperatures, viscosities, and degrees of crystallization or polymerization. Further, the mixture of flux gas components will vary depending on what type of solder paste is used for a particular assembly. It is impractical to rely on the condensed vapors forming a free-flowing liquid, that will drip from the heat exchange as suggested by Matsumura et al. Under typical reflow soldering conditions, the heat exchanger of Matsumura et al. will become covered with solidified or highly viscous condensed flux vapors reducing its efficiency and eventually rendering it incapable of condensing additional vapors. These will have to be removed or the heat exchanger must be replaced.

Replacement of contaminated heat exchangers, as suggested by Soderlund et al., adds cost to the operation of the reflow oven. Either the oven must be shut down to remove the old heat exchanger and connect a new one, reducing the productivity of the oven, or parallel flux collection systems must be installed so that one system operates while the other is being serviced, adding cost to the oven. Since the heat exchanger must be connected with a working fluid, such as chilled water, replacement is complicated and requires the services of a skilled technician.

Cleaning of the heat exchanger is difficult given the nature of the condensed flux vapors. The condensed vapors are generally not water-soluble so that a solvent is required to remove them. Many solvents are toxic and/or flammable, presenting a safety hazard to workers. Disposal of solvent waste is expensive, particularly when the solvent waste includes a variety of unknown reaction products and other chemicals from the condensed flux vapors.

SUMMARY OF THE INVENTION

The present invention overcomes problems of flux vapor condensation within solder reflow ovens and provides an inexpensive means for removing condensed vapors without condensing those vapors on a solid surface.

An object of the present invention is to provide a flux vapor management system that prevents flux vapor laden gases from migrating from a high temperature region of an oven into a cooling region of the oven.

Another object of the invention is to provide an apparatus for filtering vapors from an oven wherein an easily replaceable filter captures condensed vapors.

Another object of the invention is to provide an apparatus for filtering vapors where vapors do not condense on solid surfaces.

Yet another object of the invention is to provide a method for filtering vapors wherein vapors are condensed into liquid droplets or solid particles within a gas stream before contacting a solid surface.

Broadly, the present invention is directed to a method and apparatus for controlling the flow of gases within an oven to inhibit vapors generated during a heating process from migrating into cooler regions of the oven where they would otherwise condense, for concentrating those flux vapors in the high temperature region of the oven, for efficiently venting the flux vapors from the oven, and for condensing and filtering the flux vapors vented from the oven by mixing a hot gas stream containing the flux vapors with a cool gas stream, thereby condensing the flux vapors into particles or droplets, directing the mixed gas and condensed flux vapors through a filter and returning the filtered gas back to the oven.

According to a first aspect, an oven is provided with a number of temperature control units which each include a fan to produce forced convection. The fan circulates gas by providing a high pressure path between the fan and the oven, and a low pressure path between the oven and the fan. Outlet ports provided on the high pressure path expel gas from the oven. Inlets ports on the low pressure path draw gas into the oven. The suction provided by inlet ports on selected temperature control units are used to draw gases from a barrier vent located between a high temperature region and a cooling region of the oven inhibiting the migration of flux vapors into the cooling region from the high temperature region and concentrating flux vapors in the high temperature region of the oven.

According to a second aspect, flux vapors are concentrated in a hot gas in a high temperature region of an oven. The oven is provided with an outlet port in the high temperature region, a gas mixing jet which receives hot gas from the outlet port and mixes it with a cooled gas stream causing vapors in the hot gas to condense, a filter which traps the condensed vapors from the mixed hot and cooled gases, a diverter which returns a portion of the filtered gas to the oven, a heat exchanger which cools the remaining portion of the filtered gas to generate the cooled gas stream, and a blower which draws the hot gas from the oven and drives the filtered gas through the heat exchanger. The oven may be, for example, a reflow soldering oven and the hot gas may contain, for example, flux vapors from reflow soldering electronic components to printed circuit boards. Alternatively, the oven may be used to process other products, for example, ceramic hybrid circuits, semiconductor chips, or metallic or glass assemblies and the hot gas may include vapors generated by these processes.

According to a third aspect, the present invention is directed to a method for removing flux vapors concentrated in a high temperature region of a reflow soldering oven comprising drawing hot gas that includes flux vapors from the high temperature region of the oven, mixing that gas with a stream of cooled gas so that the flux vapors condense while suspended in the mixed gas stream, passing that mixed gas stream through a filter to trap the condensed flux vapors, and diverting a portion of the filtered gas stream through a heat exchanger to form the stream of cooled gas.

BRIEF DESCRIPTION OF THE DRAWINGS

Further characteristics, features, and advantages of the present invention will be apparent upon consideration of the following detailed description of the present invention, taken in conjunction with the following drawings, in which like reference characters refer to like parts, and in which:

FIG. 4(a) is a diagram showing a jet mixer used in the filtration system of FIG. 3;

FIG. 4(b) is a diagram showing an alternative configuration of a jet mixer used in the filtration system of FIG. 3;

FIG. 4(c) is a diagram showing another alternative configuration of a jet mixer used in the filtration system of FIG. 3

DETAILED DESCRIPTION

Figure 1:
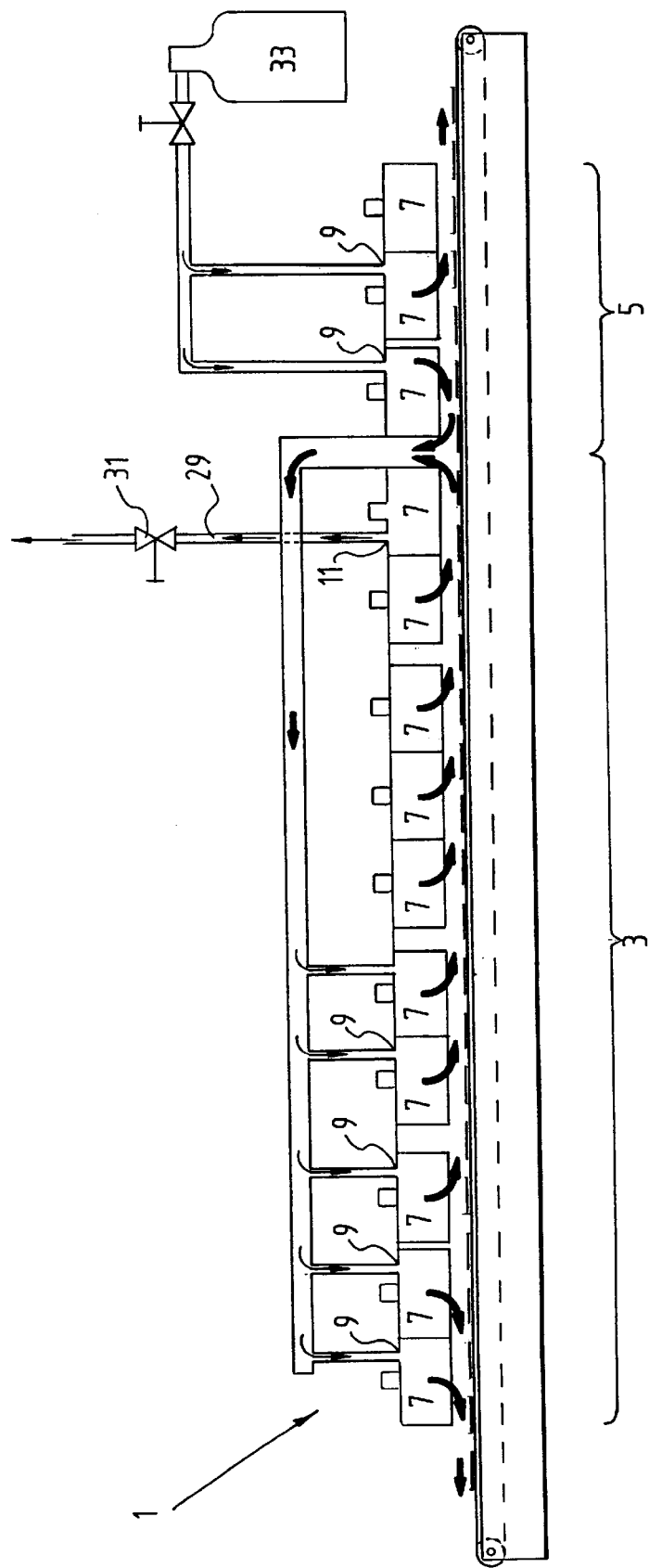
FIG. 1 is a schematic diagram of an oven according to a first embodiment of the present invention.
Figure 2:
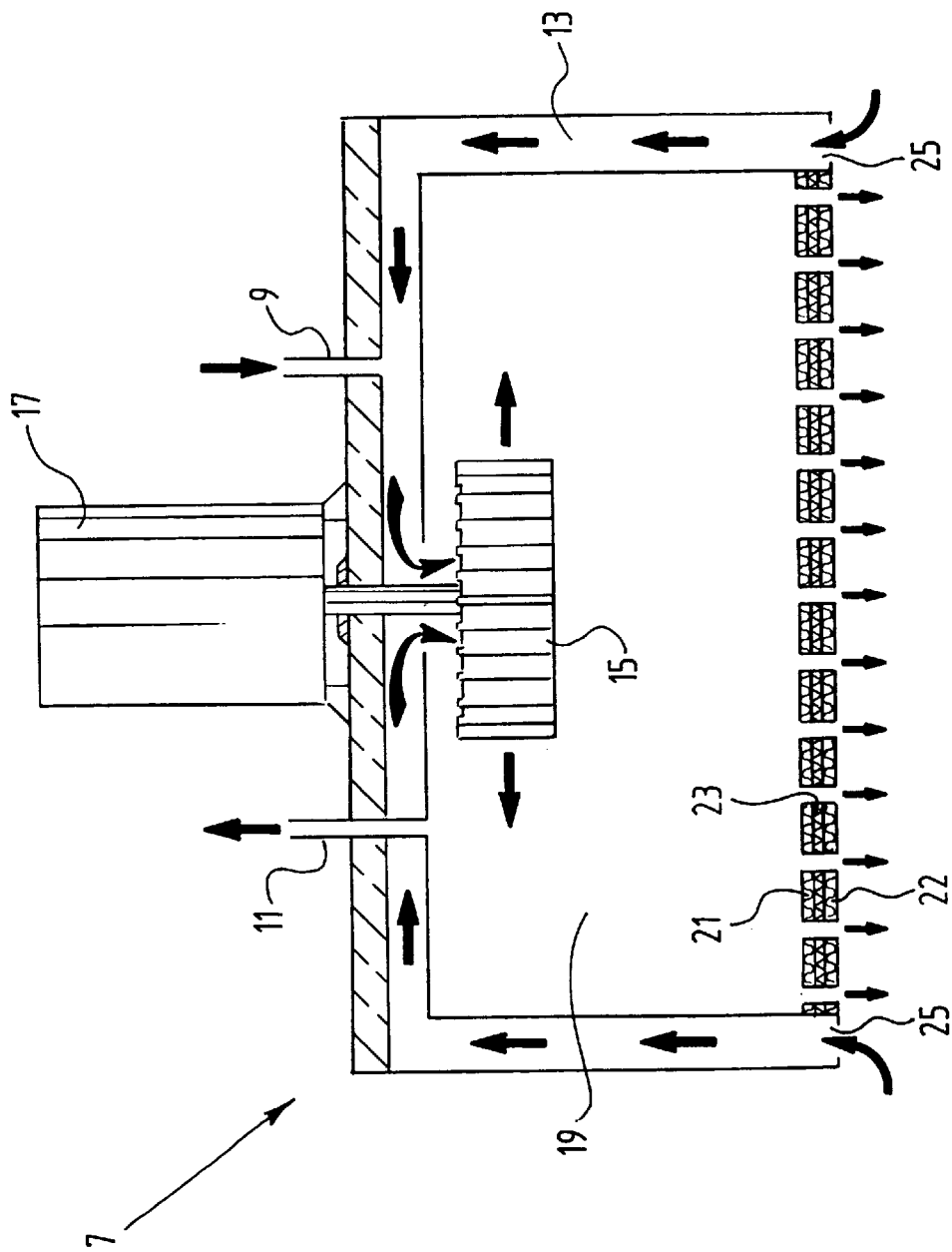
FIG. 2 is a diagram showing a temperature control unit used in the oven of FIG. 1.

FIG. 1 shows an oven 1 according to an embodiment of the present invention. This oven 1 may be, for example, a reflow solder oven. A high temperature region 3 and a cooling region 5 are created by temperature control units 7. FIG. 2 shows a temperature control unit 7 in detail. An inlet port 9 and an outlet port 11 are provided on a top surface of each unit 7. The inlet port 9 is connected with a return channel 13. The return channel 13 is connected with a centrifugal fan 15 driven by a motor 17. The centrifugal fan 15 is contained within a plenum 19. A inner diffuser 21 forms the bottom inside surface of the plenum 19. An outer diffuser 23 forms the bottom outside surface of the unit 7. Sandwiched between the inner diffuser 21 and the outer diffuser 23 is a heating element 22. Holes are provided through inner and outer diffusers 21, 23 and heating element 22 so that gas driven by the fan 15 exits the plenum 19 in a downward direction. The return channel 13 has inlets 25 on the bottom surface of the unit 7 to allow gas to circulate from the bottom of the unit 7 up to the fan 15 and back out through the diffusers 21, 23 and heater 22. The outlet port 11 is connected with the plenum 19.

The gas forced by the fan 15 is heated by the heating element 22 and heats objects, for example printed circuit boards (not shown), in the oven 1 by convection. The pressure drop of the gas drawn along the return channel 13 by the fan 15 causes suction through the inlet port 9. Positive pressure within the plenum 19 forces gas out of the outlet port 11.

As shown in FIG. 1, inlet ports 9 and outlet ports 11 are interconnected to adjust the flow of gases within the oven 1. Note that unconnected ports 9, 11 not shown in FIG. 1 are sealed. A barrier vent 27 is located between the high temperature region 3 and a cooling region 5 of the oven 1. The suction created at the inlet ports 9 of one or more of the heating units 7 in the high temperature region 3 draws gas from the barrier vent 27 and returns it to the high temperature region 3. The barrier vent 27 draws gas from the high temperature region 3 that would otherwise migrate into the cooling region 5.

Outlet ports 11 of one or more of the heating units 7 in the high temperature region 3 are connected to an exhaust outlet 29 which vents vapor laden gas into an external venting system (not shown). A valve 31 adjusts the flow of exhaust gas.

Where the oven 1 must be provided with an particular process gas, for example, nitrogen or hydrogen, the gas is supplied from a gas reservoir 33 to the inlet ports 9 of one or more units 7 in the cooling region 5. According to one embodiment, the flow of gas from the reservoir 33 is greater than the flow of gas to the exhaust port 29 resulting in a net positive pressure of supplied gas in the cooling region 5. This net positive pressure helps prevent migration of flux laden gas into the cooling region 5 from the high temperature region 3.

The flow of gas within the oven causes flux vapor laden gases to remain in the high temperature region 3 of the oven 1. This prevents condensation of these vapors on cool surfaces in the cooling region 5. Note that no additional pumping is required to establish the recirculation of gas from the barrier vent 27 into the high temperature region 3. The draft caused by the fans 15 at the inlet ports 9 of the units 7 in the high temperature region 3 provides the necessary suction.

Figure 3:
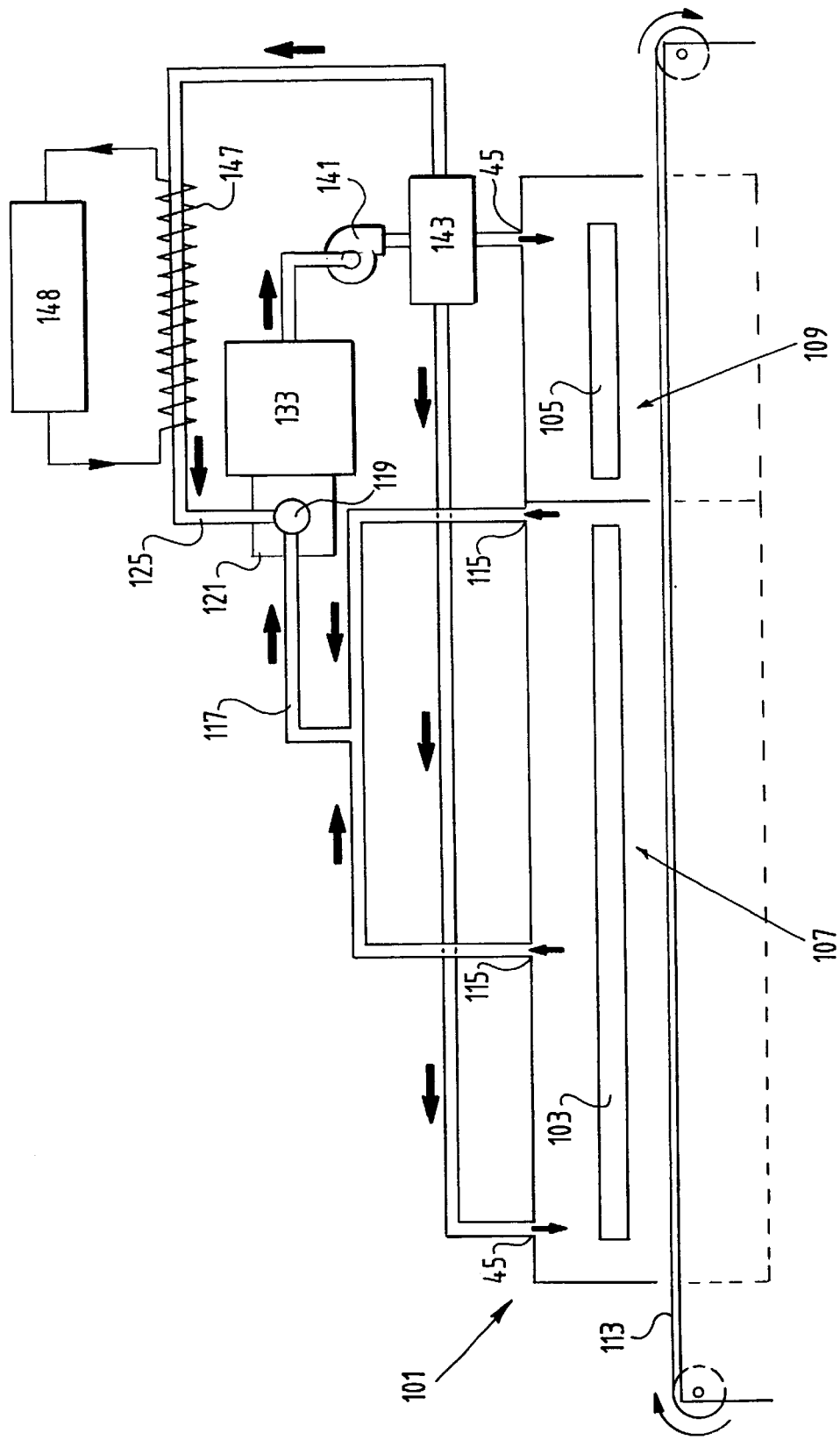
FIG. 3 is a schematic diagram of an oven filtration system according to a second embodiment of the present invention.

With reference to FIGS. 3–5, an apparatus 2 for filtering vapors from the atmosphere of an oven 101 according to a second embodiment of the present invention will be described. FIG. 3 shows an oven 101 with a heating element 103 and a cooling element 105. The heating element 103 and cooling element 105 may include temperature control units 7 such as the one shown in FIG. 2. The heating element 103 is in a high temperature region 107 of the oven 101. The cooling element 105 is in a cooling region 109 of the oven 101. A baffle 111 separates the high temperature region 107 and the cooling region 109. A conveyor 113 passes along the length of the oven 101 and carries products, such as printed circuit boards with components mounted thereon, (not shown) through the high temperature region 107 and cooling region 109 at a predetermined rate.

The oven 101 may be used, for example, to reflow solder printed circuit boards. In this case, the temperature of the high temperature region 107 is selected so that solder paste applied between electronic components and a printed circuit board is heated above its reflow temperature, causing solder particles in the paste to melt and flow. The high temperature region 107 is typically heated to around 210° C. Of course, the temperature of the high temperature region 107 will vary depending on the particular solder paste used and on other constraints imposed by the circuit board and components. The atmosphere in the oven 101 may be air. Alternatively, the oven 101 may be filled with a process gas such as nitrogen or hydrogen.

Heating the circuit board and melting the solder paste results in the liberation of vapors from the solder paste, as well as vapors from the circuit board and electronic components. These vapors, collectively known as flux vapors, have a condensation temperature lower than the temperature of the high temperature region 107 and remain vaporized within this region. The condensation temperature of the flux vapors is typically less than 120° C., however the condensation temperature will vary depending on the composition of the solder paste, as well as on the types of materials used to fabricate the electronic components and printed circuit boards.

Outlet ports 115 connect an intake manifold 117 to the high temperature region 107. Two outlet ports 115 are shown in FIG. 3. A greater or lesser number of outlet ports 115 may be provided, depending on the design of the oven 101 and on the desired flow of gases within the oven 101.

The manifold 117 is heated by the hot gas from the oven 101 so that it remains above the condensation temperature of the flux vapor. Alternatively, a heat source may be provided to the manifold 117 to keep it above the flux vapor condensation temperature. Maintaining the manifold 117 above the condensation temperature prevents condensation of the flux vapors.

The intake manifold 117 conducts hot gas from the oven 101 to a jet mixer 119. The jet mixer 119 is contained within a plenum 121. The jet mixer 119 is shown in detail in FIG. 4(a). A nozzle 118 is provided at the end of the intake manifold 117. The nozzle 118 is positioned at the center of a jet ring 123. A cool gas inlet 125 enters the side of the ring 123 and connects with an internal passage 127. The internal passage 127 connects to a number of jets 129 positioned around the ring 123. The jets 129 are directed to converge in a mixing region 131 in front of a nozzle 118. The nozzle 118 directs hot gas from the manifold 117 into the mixing region 131. Turbulent mixing of the hot gas with the cooled gas jets lowers the temperature of the hot gas below the condensation temperature of the flux vapors. As a result, flux vapors condense from the gas mixture forming solid particles or droplets.

The purpose of the jet mixer 119 is to cool the hot gas from the oven 101 without contacting solid surfaces that are below the condensation temperature of the flux vapor. Configurations which enhance turbulent mixing are advantageous. For example, one or more of the jets 130 may be directed slightly tangential to the ring 123 causing the mixed gases in the mixing region 131 to rotate as shown in FIG. 4(b).

FIG. 4(c) shows an alternative configuration of the jet mixer 119. A nozzle 118 connected to the end of the manifold 117 directs the hot gas stream into the mixing region 131. A cool gas nozzle 126 is connected to the end of the cool gas inlet 125. The cool gas nozzle 126 directs the cooled gas into the mixing region 131. The shapes of the nozzles 118, 126 are designed to enhance the complete and rapid mixing of the hot and cooled gas streams. Also, the number of nozzles 118, 126 and their position and direction relative to the mixing region 131 are selected to optimize mixing.

Figure 5A:
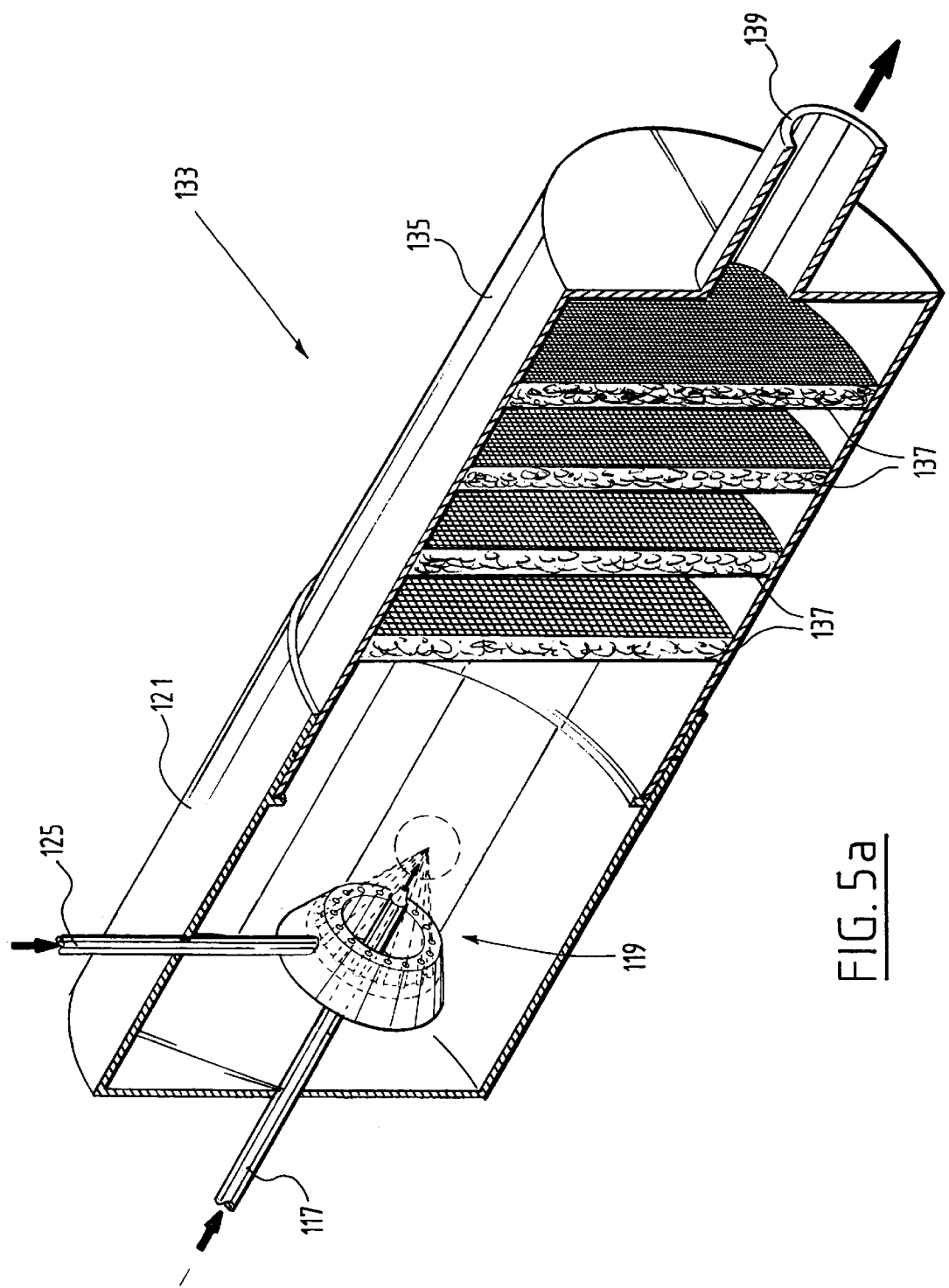
FIG. 5(a) is a diagram showing a filter used in the filtration system of FIG. 3.

As shown in FIG. 3, the plenum 121 containing the jet mixer 119 is connected with a filter 133. As shown in FIG. 5(a), the filter 133 receives the gas mixed by the mixer 119. A filter housing 135 holds one or more layers of a porous filter material 137. The layers of filter material 137 have a pore size which is selected to trap condensed flux vapor particles from the mixer 119. The layers 137 are made from a material that can withstand the temperature of the mixed gas stream indefinitely. In one embodiment, the layers 137 are made from a material that can withstand the maximum temperature of the gases in the high temperature region 107 of the oven for short periods of time in the event that hot gas enters the filter 133 without mixing with cooled gas. The filter layers 137 may be formed, for example, from polyester fibers.

A number of layers 137 may be provided to trap different components of the condensed flux vapors. For example, the layers 137 may be arranged with graduated pore sizes so that coarse particles are trapped first, before the gas stream reaches fine particle filter layers. This will prevent premature loading of the fine particle filter layers.

The filter layers 137 may be treated such that the condensed flux vapor droplets wet the filter layers 137. For example, the filter layers 137 may be coated with a material that is soluble in condensed flux vapor droplets. The filter layers 137 may also contain absorbtive materials such as activated charcoal or zeolyte to form a molecular sieve.

The filter housing 135 is designed to be easily replaced, causing little or no interruption in the operation of the oven 101. The filter 133 is formed from inexpensive materials and is disposed of and a new filter 133 installed periodically.

Figure 5B:
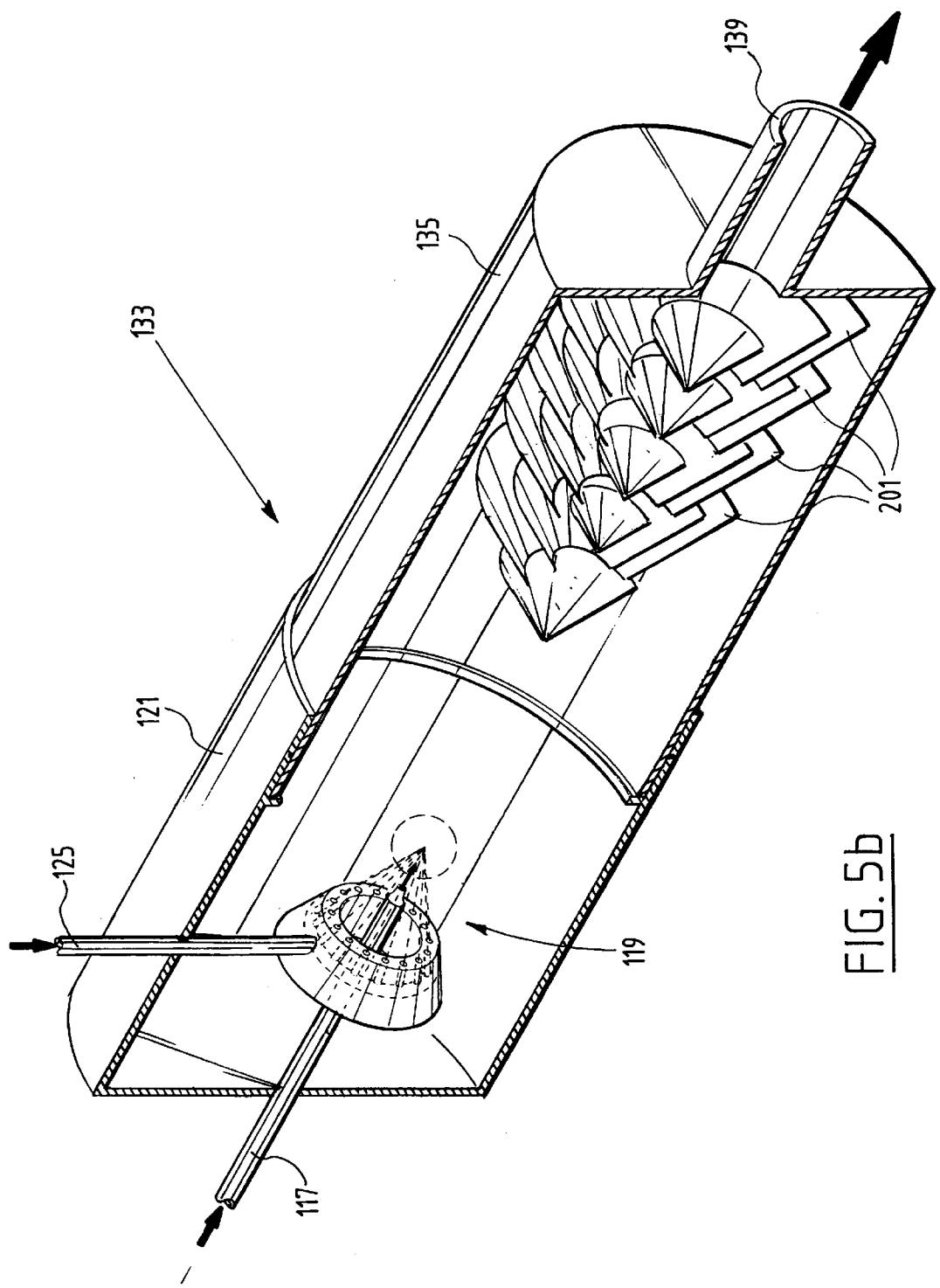
FIG. 5(b) is a diagram showing an alternative configuration of a filter used in the filtration system of FIG. 3.

Alternatively, instead of using porous layers to trap condensed particles, the mixed gas stream is directed to impact one or more solid surfaces 201 within the filter 133 as shown in FIG. 5(b). Flux particles or droplets stick to the surfaces 201. The surfaces 201 may be coated with a material that enhances the adhesion of flux particles or droplets. Periodically the surfaces 201 are replaced as they become loaded with adhering condensed flux vapor particles or droplets. The surfaces 201 are arranged to maximize contact with the mixed gas stream to capture substantially all of the condensed flux vapor. FIG. 5(b) shows a cascade arrangement of surfaces 201. Of course, other configurations for enhancing contact between a gas stream and solid surfaces 201 can be used.

Filtered gas leaves the filter 133 through the outlet 139 and is drawn into a blower 141. As shown in FIG. 3, the blower 141 forces the filtered gas into a diverter 143. The diverter 143 directs a portion of the filtered gas back to the oven 101 through return ports 145. Two return ports 145 are shown in FIG. 3 directing filtered gas into both the high temperature region 107 and cooling region 109. A greater or lesser number of return ports 145 can be provided, and the return ports 145 may be placed at different locations along the oven 101 depending on the desired gas flow. The return ports 145 are positioned to balance the flow of gases within the oven. In one embodiment, the return ports 145 are positioned so that hot gas from the high temperature region 107 containing flux vapors will not invade cooler areas of the oven. This may be accomplished by returning some of the filtered gas to the cooling region 107 (as shown by return port 145 on the left side of FIG. 3), thereby establishing a flow of gas within the oven from the cooling region 109 to the high temperature region 107.

The diverter 143 directs the remaining portion of the gas from the blower 141 through a heat exchanger 147. The heat exchanger 147 cools the filtered gas from the blower 141. Heat from the filtered gas is removed by a working fluid, for example, chilled water, from a coolant reservoir 148. Cooled gas from the heat exchanger 147 is conducted to the cooled gas inlet 125 of the jet mixer 119, described above.

The diverter 143 determines the rate of filtration of gas in the oven. The plenum 121, filter 133, blower 141, diverter 143, and heat exchanger 147 form a closed system so that the amount of gas directed back to the oven 101 by the diverter 143 will be balanced by the amount of hot gas drawn into the manifold 117. Where a large amount of vapors are generated by a particular heating process or where the vapor concentration within the high temperature region 107 must be minimized, the rate of filtration determined by the diverter 143 is increased.

The proportion of gas directed to the heat exchanger 147 by the diverter 143 is selected to cool the hot gas from the oven 101 below the condensation temperature of the flux vapor. The volume of cooled gas required will depend on the temperature of the cooled gas leaving the heat exchanger 147 and on the volume and temperature of the hot gas stream. It is thermodynamically advantageous to cool a larger volume of gas by a small amount rather than to cool a small volume by a large amount. Therefore, according to one embodiment the diverter 143 is selected to direct a greater portion of filtered gas through the heat exchanger 147 while returning a smaller portion to the oven 101. According to this embodiment the diverter 143 directs about 60% of the filtered gas volume through the heat exchanger 147 while returning 40% of the filtered gas to the oven 101.

Figure 6:
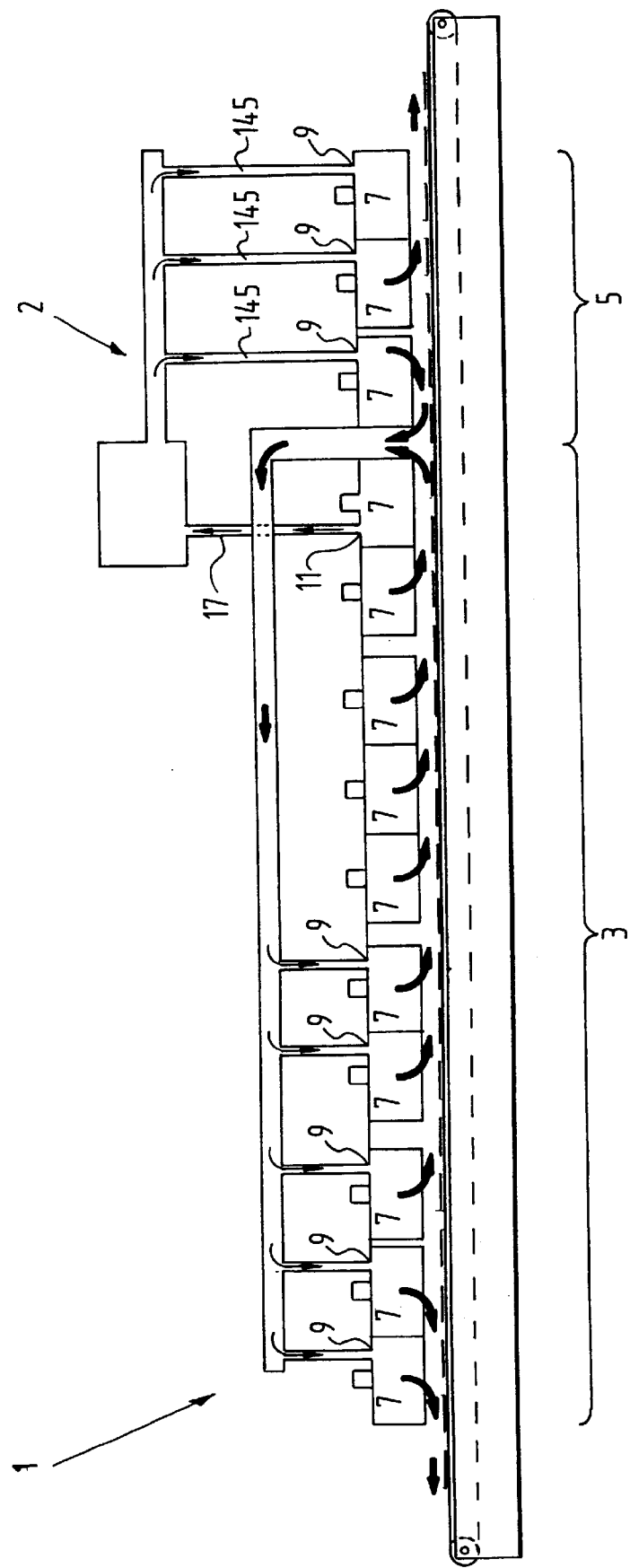
FIG. 6 is a schematic diagram of an oven incorporating the filtration system of FIG. 3.

FIG. 6 shows an oven 1 according to the first embodiment of the invention incorporating the filtration system 2 according to the second embodiment of the invention. A barrier vent 27 inhibits flux vapor laden gas in the high temperature region 3 from migrating into the cooling region 5. The intake manifold 117 of the flux filtration system 2 is connected with the outlet port 11 of a temperature control unit 7 in the high temperature region 3. The return ports 145 are connected to intake ports 11 of temperature control units 7 in the cooling region 5 of the oven 1. As a result, a net positive pressure of filtered gas is supplied to the cooling region 5, preventing migration of flux laden gas from the heating region 3 into the cooling region 5.

The above embodiments are illustrative of the present invention. It is to be understood that the invention is not limited by this disclosure, but rather is defined by the claims. This invention is intended to cover various modifications and equivalent arrangements included within the spirit and scope of the invention, as will be apparent to a person of ordinary skill in the art.

What is claimed is:

1. A filtering apparatus for a reflow oven, the apparatus comprising:
   a jet mixer connected to a high temperature region of the oven, wherein the jet mixer mixes a cooled gas stream with a hot gas stream from the oven to form a mixed gas stream;
   a filter connected with the jet mixer to filter the mixed gas stream to form a filtered gas stream; and
   a heat exchanger connected to the filter and to the jet mixer, wherein the heat exchanger cools a first portion of the filtered gas stream and forms the cooled gas stream.

2. The apparatus according to claim 1, wherein the temperature of the hot gas stream is above a condensation temperature of a flux vapor, and wherein the temperature of the mixed gas stream is below the condensation temperature of the flux vapor.

3. The apparatus according to claim 1, further comprising a diverter connected to the filter, wherein the diverter directs a second portion of the filtered gas stream to the oven.

4. The apparatus according to claim 3, wherein the first portion of the filtered gas stream is approximately 60% of the filtered gas stream and the second portion of the filtered gas stream is approximately 40% of the filtered gas stream.

5. The apparatus according to claim 1, further comprising a blower connected to the filter, wherein the blower directs the mixed gas stream through the filter.

6. The apparatus according to claim 1, wherein the jet mixer comprises a plurality of converging jets arranged to converge with a central jet.

7. The apparatus according to claim 6, wherein the central jet includes the hot gas stream and wherein the converging jets include the cooled gas stream.

8. The apparatus according to claim 6, wherein the converging jets are formed in a ring and wherein the central jet is positioned at the center of the ring.

9. The apparatus according to claim 8, wherein at least one of the converging jets has a component tangential to the ring, whereby the plurality of converging jets have a rotational component.

10. The apparatus according to claim 1, wherein the jet mixer comprises a cooled gas jet formed from the cooled gas stream intersecting with a hot gas jet formed from the hot gas stream.

11. The apparatus according to claim 2, wherein the hot gas stream includes the flux vapor and wherein the flux vapor condenses in the mixed gas stream to form particles or droplets.

12. The apparatus according to claim 11, wherein the filter comprises a porous layer, wherein the porous layer traps the particles or droplets.

13. The apparatus according to claim 12, wherein the porous layer includes polyester fibers.

14. The apparatus according to claim 11, wherein the filter includes a plurality of layers of porous material arranged to trap a plurality of components of the condensed flux vapor.

15. The apparatus according to claim 14, wherein a first layer traps larger particles or droplets and a second layer traps smaller particles or droplets and wherein the mix gas stream passes first through the first layer and then through the second layer.

16. The apparatus according to claim 11, wherein the filter includes an absorbtive material.

17. The apparatus according to claim 16, wherein the absorbtive material includes a porous layer treated to be wet by the droplets.

18. The apparatus according to claim 16, wherein the absorbtive material includes activated charcoal.

19. The apparatus according to claim 16, wherein the absorbtive material includes zeolyte.

20. The apparatus according to claim 11, wherein the filter includes a solid surface adapted so that the particles or droplets will adhere to the surface.

21. The apparatus according to claim 3, further comprising:

an outlet port arranged in the high temperature region of the oven connected to the jet mixer, wherein the hot gas stream flows through the outlet port; and an intake port connected to the diverter and to the oven, wherein the second portion of the filtered gas stream flows through the intake port into the oven.

22. The apparatus according to claim 21, wherein the intake port and outlet port are arranged to prevent migration of gas from the high temperature region of the oven.

23. The apparatus according to claim 2, wherein the flux vapor condensation temperature is less than 120° C.

24. An apparatus for filtering an atmosphere of a reflow oven, the apparatus comprising:

hot gas collecting means for collecting a stream of hot gas from the oven;

mixing means for mixing the hot gas stream with a cooled gas stream to form a mixed gas stream;

filter means for filtering the mixed gas stream to form a filtered gas stream; and cooling means for cooling a first portion of the filtered gas stream to form the cooled gas stream and for providing the cooled gas stream to the mixing means.

25. The apparatus according to claim 24, further comprising a diverter means for directing a second portion of the filtered gas stream to the oven.

26. The apparatus according to claim 24, further comprising blower means for drawing the hot gas stream from the oven.

27. The apparatus according to claim 24, wherein the hot gas collecting means includes an outlet port for drawing gas from a high temperature region of the oven.

28. The apparatus according to claim 25, further comprising an intake port connected to the diverter means for returning the second portion of the filtered gas stream to a selected region of the oven.

29. A method for filtering a flux vapor from a gas in a reflow oven, comprising:

heating the gas to a temperature above a condensation temperature of the flux vapor to form a hot gas;

mixing the hot gas with a cooled gas, wherein the mixed gases are below the condensation temperature of the flux vapor;

filtering the mixed gases; and cooling a first portion of the filtered gases to form the cooled gas.

30. The method according to claim 29, wherein the flux vapor condenses in the mixed gases and forms particles or droplets.

31. The method according to claim 29, wherein the step of mixing includes:

forming the hot gas into a hot gas jet;

forming the cooled gas into a cooled gas jet; and converging the hot gas jet and the cooled gas jet, wherein the converged jets form a turbulent mixing region.

32. The method according to claim 29, further comprising returning a second portion of the filtered gas to the oven.

33. The method according to claim 31, wherein the cooled gas jet is formed by a plurality of nozzles arranged in a ring and directed to converge in the turbulent mixing region and wherein the hot gas jet is formed by a nozzle concentric with the ring.

34. The method according to claim 33, wherein at least one of the plurality of nozzles has a component tangential to the ring, wherein gases in the turbulent mixing region rotate.

35. Th e method according to claim 29, wherein the cooled gas jet is formed by a single nozzle and the hot gas jet is formed by a single nozzle.

36. The method according to claim 29, wherein the step of filtering includes passing the mixed gases through a porous layer, wherein the pore size of the porous layer is selected to trap the particles or droplets.

37. The method according to claim 29, wherein the step of filtering includes passing the mixed gases through a plurality of porous layers, wherein the porous layers have different pore sizes and the layers are arranged so that larger particles or droplets are trapped by first layers and smaller particles or droplets are trapped by second layers.

* * * * *